US 6,792,797 B2

(12) United States Patent
Satoh et al.

(10) Patent No.: US 6,792,797 B2
(45) Date of Patent: Sep. 21, 2004

(54) ENGINE MALFUNCTION DETECTION SYSTEM

(75) Inventors: Kazuhiro Satoh, Wako (JP); Nobuhiro Takahashi, Takanezawa-machi (JP)

(73) Assignees: Honda Giken Kogyo Kabushiki Kaisha, Tokyo (JP); Keihin Corporation, Tokyo (JP)

( * ) Notice: Subject to any disclaimer, the term of this patent is extended or adjusted under 35 U.S.C. 154(b) by 0 days.

(21) Appl. No.: 10/267,992

(22) Filed: Oct. 10, 2002

(65) Prior Publication Data

US 2003/0106365 A1 Jun. 12, 2003

(30) Foreign Application Priority Data

Oct. 12, 2001 (JP) ....................................... 2001-315851

(51) Int. Cl.[7] ............................................ G01M 19/00
(52) U.S. Cl. ..................................................... 73/118.1
(58) Field of Search ................... 73/118.1; 123/406.54; 340/461; 322/99, 28

(56) References Cited

U.S. PATENT DOCUMENTS 4,053,868 A * 10/1977 Cox et al. ................. 340/52 F
4,348,629 A * 9/1982 Sievers ........................ 322/99
4,379,990 A * 4/1983 Sievers et al. ................ 322/99
6,467,456 B2 * 10/2002 Shidara et al. .......... 123/406.54

FOREIGN PATENT DOCUMENTS

JP          09-105350          4/1997

* cited by examiner

Primary Examiner—Edward Lefkowitz
Assistant Examiner—Octavia Davis
(74) Attorney, Agent, or Firm—Westerman, Hattori, Daniels & Adrian, LLP

(57) ABSTRACT

A system for detecting malfunction of an equipment such as an alternator or a hydraulic switch that is connected to an internal combustion engine and generates an output. In the system, it is discriminated periodically for a predetermined period of time whether the output of the equipment is within a predetermined range, a number of times that the output of the equipment is discriminated to be out of the predetermined range is counted; and the equipment is determined to have malfunctioned when the count is equal to or greater than the reference value. With this, it becomes possible to detect the malfunction of the equipment accurately.

12 Claims, 6 Drawing Sheets

ENGINE MALFUNCTION DETECTION SYSTEM

BACKGROUND OF THE INVENTION

1. Field of the Invention

This invention relates to an engine malfunction detection system, particularly a malfunction detection system of an internal combustion engine, more particularly to a malfunction detection system of equipments such as an alternator (alternating current electrical generator), a sensor or switch, that are connected to an internal combustion engine.

2. Description of the Related Art

Usually, an internal combustion engine is provided with equipments including an alternator, sensors (switches) that generate outputs and has an electronic control unit (ECU) constituted as a microcomputer. The ECU is supplied with the power generated by the alternator to operate and computes manipulated variables to control the operation of the engine based on the outputs sent from the sensors and switches.

In such an engine, if one or all of the equipments has malfunctioned, it becomes difficult to control the engine as desired. For that reason, as regards a crank angle sensor output indicative of a signal indicative of a reference piston position, Japanese Laid-Open Patent Application No. Hei 9 (1997)-105350 teaches removing as noise an output generated by the sensor that is less than an effective crank angular value.

While this prior art system does disclose eliminating the influence of noise in the sensor outputs and does not disclose detecting the malfunction of equipments, it is desirable to detect or discriminate the malfunction of equipment connected to the engine

SUMMARY OF THE INVENTION

An object of the present invention is therefore to provide an engine malfunction detection system which detects or discriminates malfunction of equipment that is connected to the engine.

For realizing this object, there is provided a system for detecting malfunction of an equipment that is connected to an internal combustion engine and generates an output; comprising; output discriminating means for discriminating periodically for a predetermined period of time whether the output of the equipment is within a predetermined range; counting means for counting a number of times that the output of the equipment is discriminated to be out of the predetermined range; and malfunction determining means for comparing the count with a reference value and for determining that the equipment has malfunctioned when the count is equal to or greater than the reference value.

BRIEF DESCRIPTION OF THE DRAWINGS

The objects and advantages of the invention will be made apparent with reference to the following descriptions and drawings, in which.

DETAILED DESCRIPTION OF THE PREFERRED EMBODIMENT

An engine malfunction detection system according to an embodiment of the present invention will now be explained with reference to the attached drawings.

Figure 1:
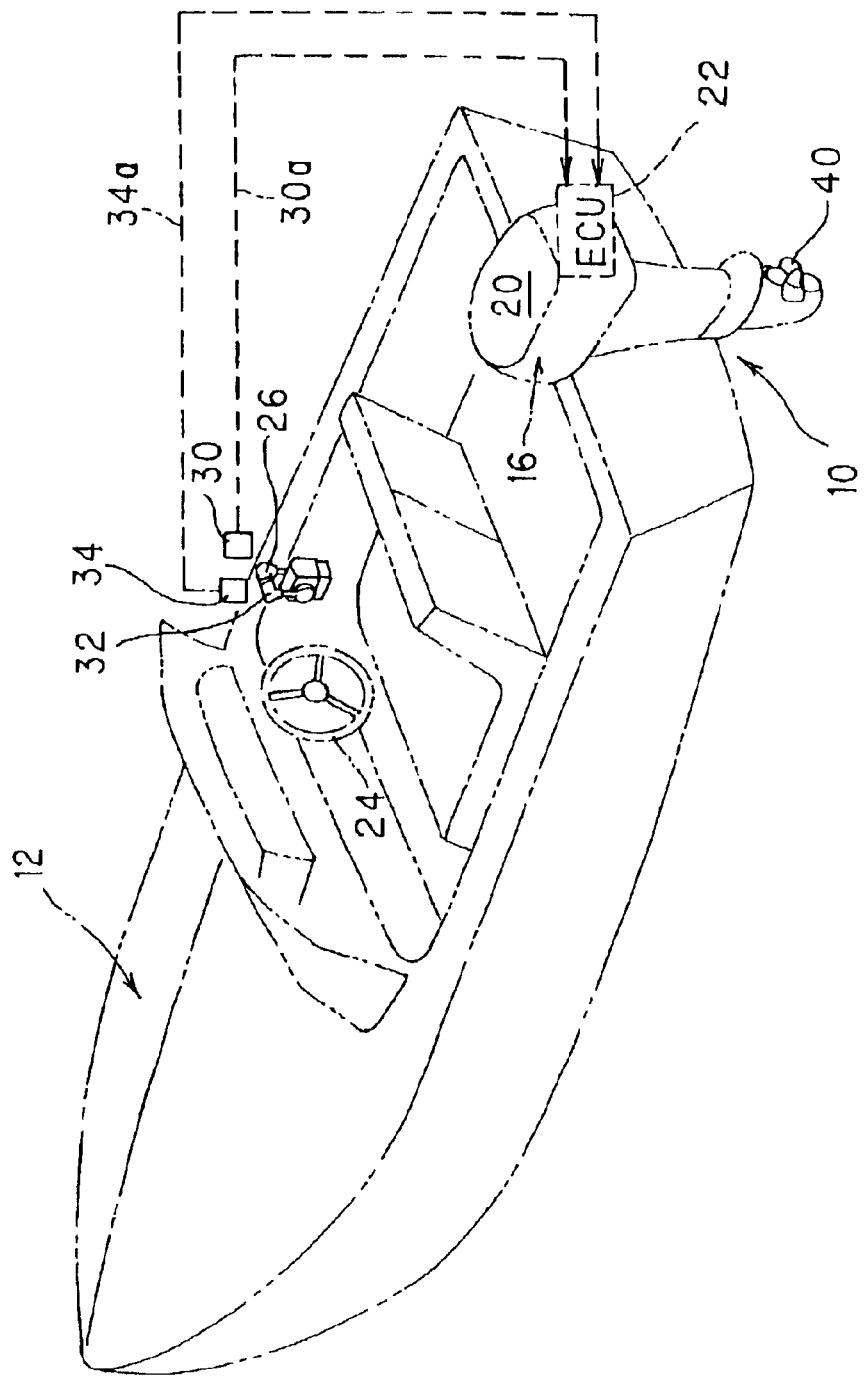
FIG. 1 is a schematic view showing the overall configuration of an engine malfunction detection system embodied, for example, as that for an outboard motor, according to an embodiment of the present invention.

FIG. 1 is a schematic view showing the overall configuration of an engine malfunction detection system embodied, for example, as that for an outboard motor, according to an embodiment of the present invention.

Reference numeral 10 in FIGS. 1 and 2 designates the aforesaid propulsion unit including an internal combustion engine, propeller shaft and propeller integrated into what is hereinafter called an "outboard motor." The outboard motor 10 is mounted on the stern of a boat (small craft) 12 by a clamp unit 14 (see FIG. 2).

Figure 2:
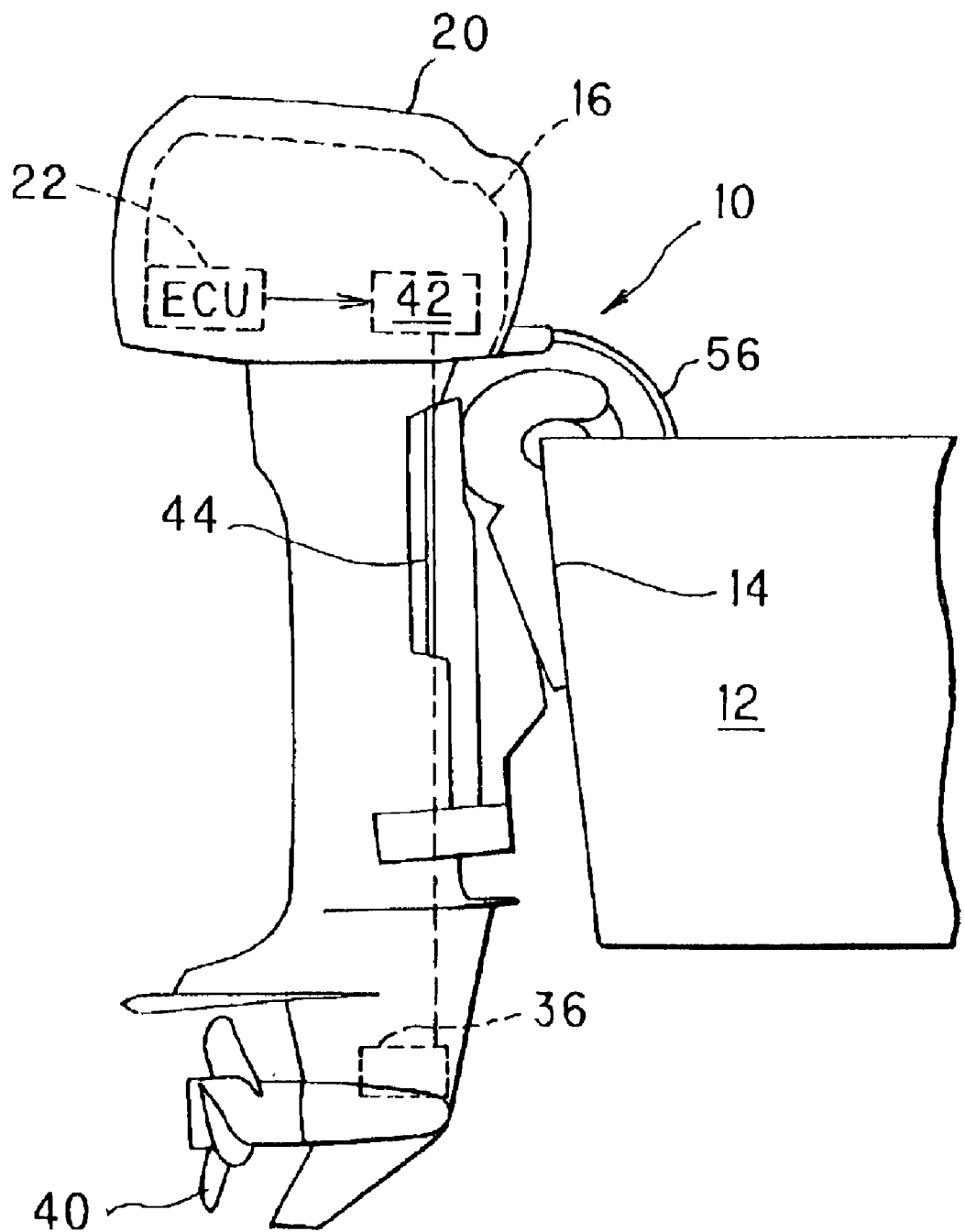
FIG. 2 is an enlarged side view of one portion of FIG. 1.

As shown in FIG. 2, the outboard motor 10 is equipped with the internal combustion engine (hereinafter called the "engine") 16. The engine 16 is a spark-ignition V-6 gasoline engine. The engine is positioned above the water surface and is enclosed by an engine cover 20 of the outboard motor 10. An electronic control unit (ECU) 22 composed of a microcomputer is installed near the engine 16 enclosed by the engine cover 20.

As shown in FIG. 1, a steering wheel 24 is installed in the cockpit of the boat 12. When the operator turns the steering wheel 24, the rotation is transmitted to a rudder (not shown) fastened to the stern through a steering system not visible in the drawings, changing the direction of boat advance.

A throttle lever 26 is mounted on the right side of the cockpit and near it is mounted a throttle lever position sensor 30 that outputs a signal corresponding to the position of the throttle lever 26 set by the operator.

A shift lever 32 is provided adjacent to the throttle lever 26 and next to it is installed a neutral switch 34 that outputs an ON signal when the operator puts the shift lever 32 in Neutral and outputs an OFF signal when the operator puts the shift lever 32 in Forward or Reverse. The outputs from the throttle lever position sensor 30 and neutral switch 34 are sent to the ECU 22 through signal lines 30a and 34a.

The output of the engine 16 is transmitted through a crankshaft and a drive shaft (neither shown) to a clutch 36 of the outboard engine 10 located below the water surface. The clutch 36 is connected to a propeller 40 through a propeller shaft (not shown).

The clutch 36, which comprises a conventional gear mechanism, is omitted from the drawing. It is composed of a drive gear that rotates unitarily with the drive shaft when the engine 16 is running, a forward gear, a reverse gear, and a dog (sliding clutch) located between the forward and reverse gears that rotates unitarily with the propeller shaft. The forward and reverse gears are engaged with the drive gear and rotate idly in opposite directions on the propeller shaft.

The ECU 22 is responsive to the output of the neutral switch 34 received on the signal line 34a for driving an actuator (electric motor) 42 via a drive circuit (not shown)

so as to realize the intended shift position. The actuator 42 drives the dog through a shift rod 44.

When the shift lever 32 is put in Neutral, the engine 16 and the propeller shaft are disconnected and can rotate independently. When the shift lever 32 is put in Forward or Reverse position, the dog is engaged with the forward gear or the reverse gear and the rotation of the engine 16 is transmitted through the propeller shaft to the propeller 40 to drive the propeller 40 in the forward direction or the opposite (reverse) direction and thus propel the boat 12 forward or backward.

The engine 16 will now be explained with reference to FIGS. 3 and 4.

Figure 3:
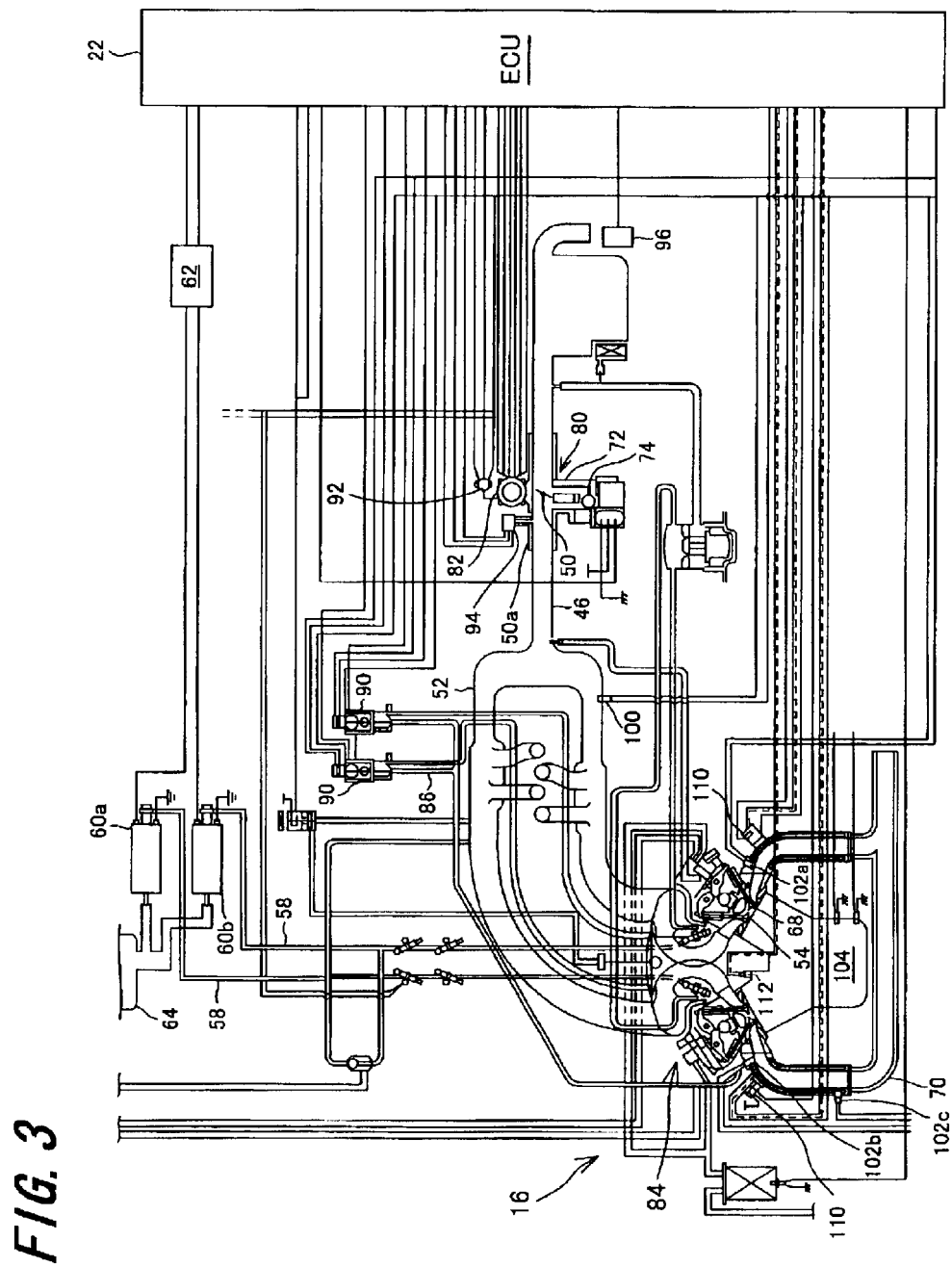
FIG. 3 is a schematic diagram showing details of the engine of the motor shown in FIG. 1.

As shown in FIG. 3, the engine 16 is equipped with an air intake pipe 46. Air drawn in through an air cleaner (not shown) is supplied to intake manifolds 52 provided one for each of left and right cylinder banks disposed in V-like shape as viewed from the front, while the flow thereof is adjusted by a throttle valve 50, and finally reaches an intake valves 54 of the respective cylinders. An injector 56 (not shown in FIG. 3) is installed in the vicinity of each intake valve (not shown) for injecting fuel (gasoline).

The injectors 56 are connected through two fuel lines 58 provided one for each cylinder bank to a fuel tank (not shown) containing gasoline. The fuel lines 58 pass through separate fuel pumps 60a and 60b equipped with electric motors (not shown) that are driven via a relay circuit 62 so as to send pressurized gasoline to the injectors 56. Reference numeral 64 designates a vaporized fuel separator.

The intake air is mixed with the injected gasoline to form an air-fuel mixture that passes into the combustion chamber (not shown) of each cylinder, where it is ignited by a spark plug 66 (not shown in FIG. 3) to burn explosively and drive down a piston (not shown). The so-produced engine output is taken out through a crankshaft. The exhaust gas produced by the combustion passes out through exhaust valves 68 into exhaust manifolds 70 provided one for each cylinder bank and is discharged to the exterior of the engine.

As illustrated, a branch passage 72 for secondary air supply is formed to branch off from the air intake pipe 46 upstream of the throttle valve 50 and rejoin the air intake pipe 46 downstream of the throttle valve 50. The branch passage 72 is equipped with an electronic secondary air control valve (EACV) 74.

The EACV 74 is connected to the ECU 22. The ECU 22 calculates a current command value that it supplies to the EACV 74 so as to drive the EACV 74 for regulating the opening of the branch passage 72. The branch passage 72 and the EACV 74 thus constitute a secondary air supplier 80 for supplying secondary air in proportion to the opening of the EACV 74.

The throttle valve 50 is connected to an actuator (stepper motor) 82. The actuator 82 is connected to the ECU 22. The ECU 22 calculates a current command value proportional to the output of the throttle lever position sensor 30 and supplies it to the actuator 82 through a drive circuit (not shown) so as to regulate the throttle opening or position TH.

More specifically, the actuator 82 is directly attached to a throttle body 50a housed in the throttle valve 50 with its rotating shaft (not shown) oriented to be coaxial with the throttle valve shaft. In other words, the actuator 82 is attached to the throttle body 50a directly, not through a linkage, so as to simplify the structure and save mounting space. Thus, in this embodiment, the push cable is eliminated and the actuator 82 is directly attached to the throttle body 50a for driving the throttle valve 50.

The engine 16 is provided in the vicinity of the intake valves 54 and the exhaust valves 68 with a variable valve timing system 84. When engine speed and load are relatively high, the variable valve timing system 84 switches the valve open time and lift to relatively large values (Hi V/T). When the engine speed and load are relatively low, it switches the valve open time and lift to relatively small values (Lo V/T).

The exhaust system and the intake system of the engine 16 are connected by EGR (exhaust gas recirculation) passages 86 provided therein with EGR control valves 90. Under predetermined operating conditions, a portion of the exhaust gas is returned to the air intake system.

The actuator 82 is connected to a throttle position sensor 92 responsive to rotation of the throttle shaft for outputting a signal proportional to the throttle opening or position TH. A manifold absolute pressure sensor 94 is installed downstream of the throttle valve 50 for outputting a signal proportional to the manifold absolute pressure PBA in the air intake pipe (engine load). In addition, an atmospheric air pressure sensor 96 is installed near the engine 16 for outputting a signal proportional to the atmospheric air pressure PA.

An intake air temperature sensor 100 installed downstream of the throttle valve 50 outputs a signal proportional to the intake air temperature TA. A first temperature sensor 102a and a second temperature sensor 102b each installed at cooling passages (not shown) connected to the water inlet (not shown) via a thermostat (not shown) of the left and right cylinder banks, output signals indicative of the temperature at those locations, and a third temperature sensor 102c installed in the exhaust manifolds 70 of one of the left and right cylinder banks outputs a signal indicative of the engine temperature TOH and the engine coolant temperature TW. Thus, the three temperature sensors 102a, 102b and 102c function as the sensors for detecting the engine temperature TOH and the engine coolant temperature TW.

$O_2$ sensors 110 installed in the exhaust manifolds 70 output signals reflecting the oxygen concentration of the exhaust gas. A knock sensor 112 installed at a suitable location on the cylinder block 104 outputs a signal related to knock.

Figure 4:
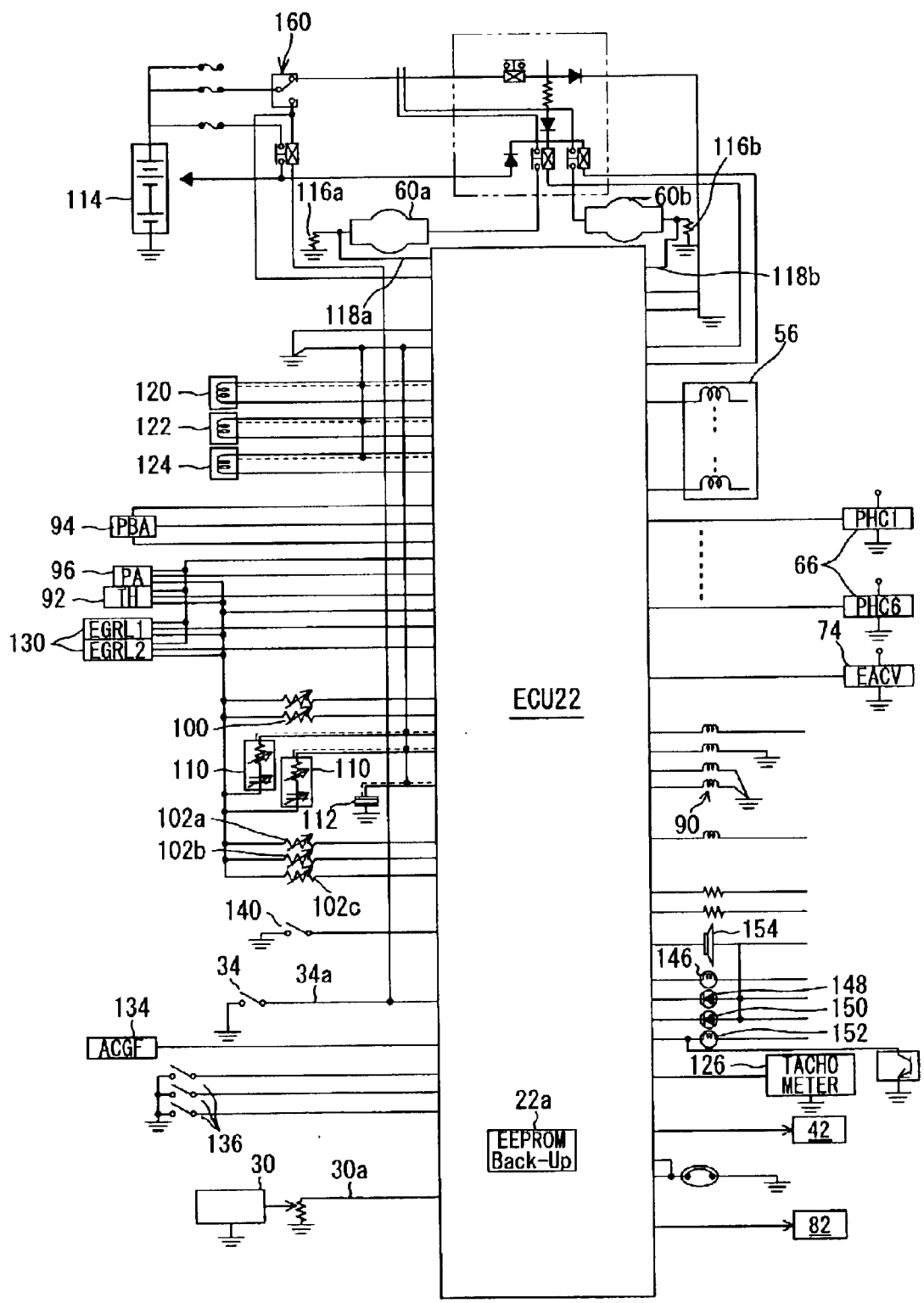
FIG. 4 is a block diagram setting out the particulars of inputs/outputs to and from the electronic control unit (ECU) shown in FIG. 1.

The explanation of the outputs of the sensors and the inputs/outputs to/from the ECU 22 will be continued with reference to FIG. 4. Some sensors and signal lines do not appear in FIG. 3.

The motors of the fuel pumps 60a and 60b are connected to an onboard battery 114 and detection resistors 116a and 116b are inserted in the motor current supply paths. The voltages across the resistors are input to the ECU 22 through signal lines 118a and 118b. The ECU 22 determines the amount of current being supplied to the motors from the voltage drops across the resistors and uses the result to discriminate whether any abnormality is present in the fuel pumps 60a and 60b.

TDC (top dead center) sensors 120 and 122 and a crank angle sensor 124 are installed near the engine crankshaft for producing and outputting to the ECU 22 cylinder discrimination signals, angle signals near the top dead centers of the pistons, and a crank angle signal once every 30 degrees. The ECU 22 calculates the engine speed NE from the output of the crank angle sensor. Lift sensors 130 installed near the EGR control valves 90 produce and send to the ECU 22 signals related to the lifts (valve openings) of the EGR control valves 90.

The engine 16 is connected with an alternator "ACGF" whose F terminal is shown as "ACGF" in the figure) 134 and its output (generated alternating current) is inputted to the ECU 22.

Three hydraulic (oil pressure) switches 136 installed in the hydraulic circuit (not shown) of the variable valve timing system 84 produce and output to the ECU 22 a signal related to the detected hydraulic pressure. A hydraulic switch 140 installed in the hydraulic circuit (not shown) of the engine 16 produces an OFF-signal (L-level signal) when the hydraulic pressure is equal to or greater a predetermined value and an ON-signal (H level signal) when the hydraulic pressure becomes less than the predetermined value. The signal (output) of the hydraulic switch is sent to the ECU 22.

The ECU 22, which is composed of a microcomputer as mentioned earlier, is equipped with an EEPROM (electrically erasable and programmable read-only memory) 22a for back-up purposes. The ECU 22 uses the foregoing inputs to carry out the overheat, hydraulic pressure abnormality, etc, and happened, it turns on any of warning lamps 146, 148, 150 and sounds a buzzer 154. It also turns on a lamps 152 when the ECU 22 detects malfunction of the equipment such as the alternator 134 (and the hydraulic switch 140) and sounds the buzzer 154.

The operation of the illustrated engine malfunction detection system will now be explained.

Figure 5:
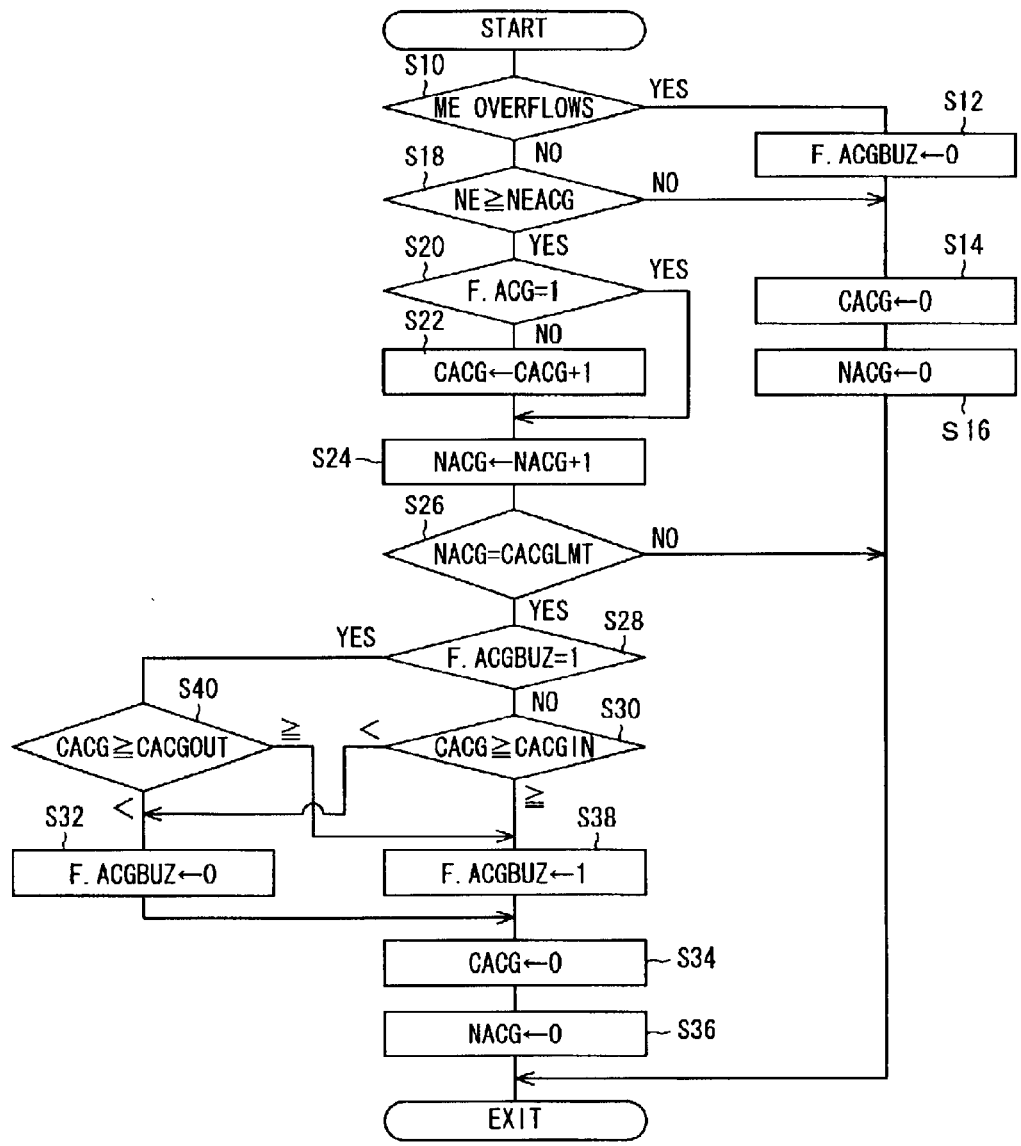
FIG. 5 is a flow chart showing the operation of the system illustrated in FIG. 1.

FIG. 5 is a flow chart showing the operation. The alternator 134 is selected as the equipment whose malfunction is to be detected. The illustrated program is executed when an ignition switch (indicated by reference numeral 160 in FIG. 4) is turned to the ACC position whereafter it is looped once every 100 msec.

The program begins in S10 in which it is determined whether a value ME overflows. Since, the value ME indicates a reciprocal of the engine speed NE, this amounts for determining whether the engine 16 is stopped.

When the result of S10 is affirmative, the program proceeds to S12 in which the bit of a flag ACGBUZ (explained later) is reset to 0, proceeds to S14 in which the value of a counter CACG (explained later) is reset to zero, and proceeds to S16 in which the value of a second counter NACG is reset to zero.

When the result in S10 is negative in a next program loop, the program proceeds to S18 in which it is determined whether the detected engine speed NE is equal to or greater than a predetermined engine speed NEACG (e.g., 580 rpm) and when the result is negative, the program proceeds to S14. Since the output (generated power) is unstable when the engine speed is less than the predetermined speed, the malfunction detection should thus be avoided.

When the result in S18 is affirmative, the program proceeds to S20 in which it is determined whether the bit of a flag F.ACG is set to 1. The bit of this flag is set/reset in a routine (not shown) and its bit is set to 1 when the output of the alternator 134 is equal to or greater than a predetermined value (e.g., 0 or a quite small voltage), in other words, when the output is within a predetermined range (power generating).

When the result in S20 is negative, i.e, when it has been discriminated that the output of the alternator 134 is out of the predetermined range, the program proceeds to S22 in which the counter CACG is incremented by one and proceeds to S24 in which the second counter NACG is incremented by one. When the result in S20 is affirmative, the program skips S22. The program then proceeds to S26 in which it is determined whether the value of the counter NACG, in other words, the number of program loops has reached an upper limit CACGLMT (e.g., 20). Thus, it is determined in this step whether a predetermined period of time has expired.

When the result in S26 is negative, the program is immediately terminated. On the other hand, when the result in S26 is affirmative, the program proceeds to S28 in which it is determined whether the bit of the flag F.ACGBUZ is set to 1. Since the bit of this flag has been reset to 0 in S12, the result is normally negative and the program proceeds to S30 in which it is determined whether the value of the counter CACG is equal to or greater than a reference value CACGIN (e.g., 10).

When it is determined in this step that the counter value is less than the reference value, the program proceeds to S32 in which the bit of the flag F.ACGBUZ is reset to 0 and proceeds to S34 in which the value of the counter CACG is reset to zero, and proceeds to S36 in which the value of the counter NACG is reset to zero.

On the other hand, When it is determined in S30 that the counter value is equal to or greater than the reference value, the program proceeds to S38 in which the bit of the flag F.ACGBUZ is set to 1. With this, in a routine (not shown), the buzzer 154 is sounded and the warning lamp 152 is turned on to warn the operator. The program then proceeds to S34 in which the value of the counter CACG is reset to zero, and proceeds to S36 in which the value of the counter NACG is reset to zero.

Accordingly, in a next program loop, the result in S28 becomes affirmative and the program proceeds to S40 in which it is determined whether the value of the counter CACG is equal to or greater than a second reference value CACGOUT (e.g. 1). When it is found that the counter value is equal to or greater than the second reference value, the program proceeds to S38 in which the bit of the flag F.ACGBUZ is set to 1 (to continue warning). On the other hand, when it is found that the counter value is less than the second reference value, the program proceeds to S32 in which the bit of the flag F.ACGBUZ is reset to 0 to stop warning.

Having been configured in the foregoing manner, the system according to the embodiment can accurately detect or discriminate the malfunction or abnormality of the alternator (equipment) 134. Specifically, the malfunction of the alternator 134 could be detected by counting the number (or period of time) of determination that its output is less than the predetermined value, i.e., it is not generating power. However, in that method, if the alternator output could be higher than the predetermined value due to noise, making difficult to detect the malfunction accurately.

On the other hand, in the system according to the embodiment, since the number of determination that the alternator output is less than the predetermined value is counted for a prescribed period of time and the count is compared with the reference value to detect the malfunction, even if the alternator output becomes greater due to noise, it is possible to detect the malfunction accurately. In addition, no additional component is needed for detecting the malfunction, the configuration is simple.

It should be noted in the above that, it is alternatively possible to obtain the counts for several times and to calculate an average value of the counts. This would further improve the detection accuracy.

It should also be noted in the above that, at least one or all of the predetermined period of time (corresponding to CACGLMT) and the reference value CACGIN (or CACGOUT) should be preset based on the nature or kind of the output of the equipment (alternator 134) whose malfunction is to be detected. With this, it becomes possible to further improve the detection accuracy.

Figure 6:
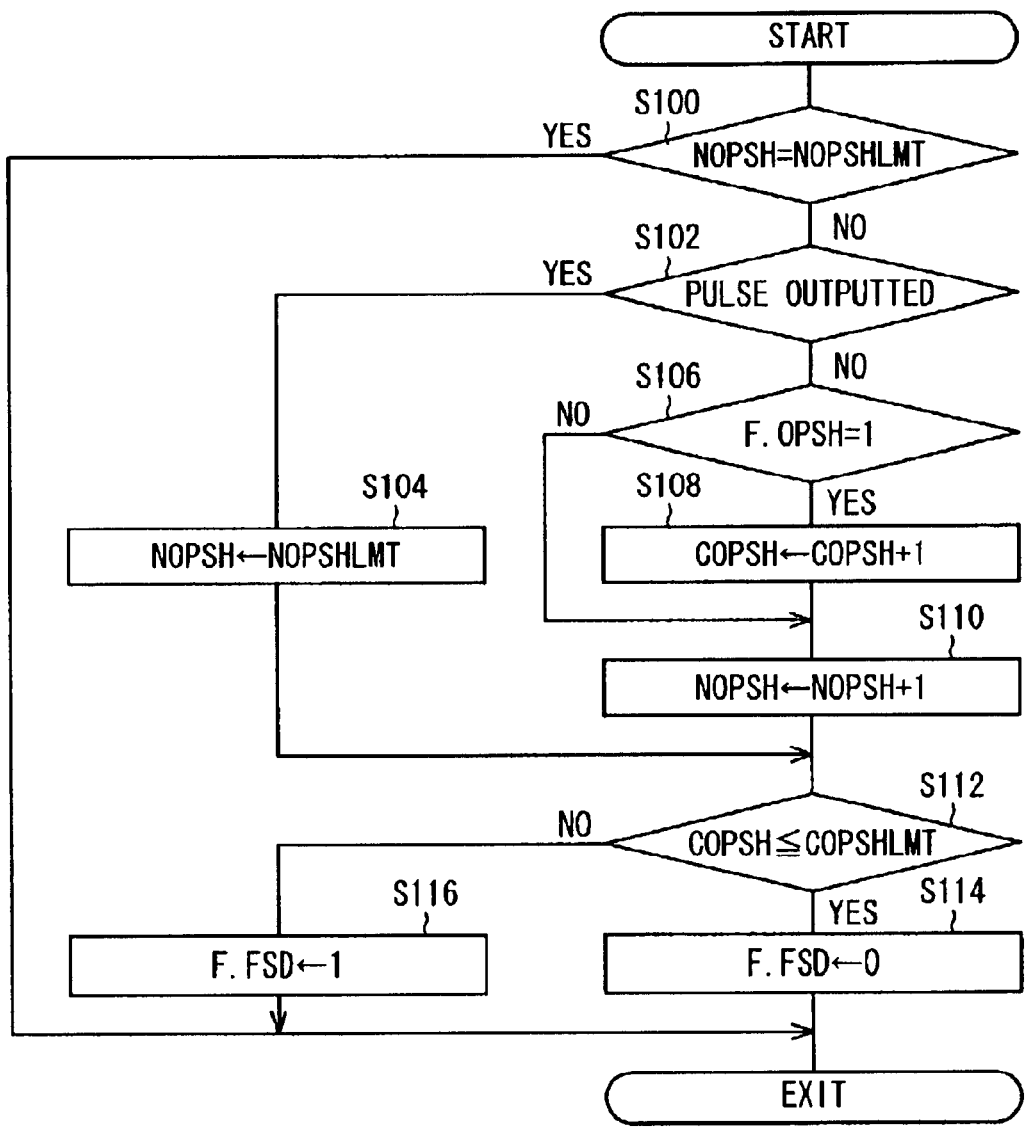
FIG. 6 is a view, similar to FIG. 5, but showing the operation of an engine malfunction detection system according to a second embodiment of the invention.

FIG. 6 is a flow chart, similar to FIG. 5, but showing the operation of an engine malfunction detection system according to a second embodiment of the invention.

In the second embodiment, the hydraulic switch 140 is selected as the equipment whose malfunction is to be detected. The illustrated program is also executed when the ignition switch is turned to the ACC position whereafter it is looped once every 100 msec.

The program begins in S100 in which it is determined whether the value of a counter NOPSH (explained later; whose initial value is 0) has reached its upper limit NOPSHLMT (e.g., 10), specifically it is determined whether the number of program loops has reached the upper limit, more specifically it is determined that a predetermined period of time has expired.

When the result in S100 is affirmative, the program is immediately terminated. When the result in S100 is negative, the program proceeds to S102 in which it is determined whether the pulses are outputted from the crank angle sensor 124, in other words it is determined whether the engine 16 has started.

Since the engine 16 is for the outboard motor, the malfunction detection of the hydraulic switch 140 is conducted at the time starting the engine 16 (before leaving port) by detecting the presence or absence of the hydraulic pressure. Therefore, when the result in S102 is affirmative, the program proceeds to S104 in which the counter value is replaced with the upper limit. As a result, the result in S100 is affirmative in the next program loop, the program is immediately terminated.

On the other hand, when the result in S102 is negative, the program proceeds to S106 in which it is determined whether the bit of a flag F.OPSH is set to 1.

The bit of this flag is set to 1 in a routine (not shown) when the output (signal) of the hydraulic switch 140 is the OFF signal (L level signal), in other word, when the switch output indicates that hydraulic pressure is equal to or greater than the predetermined value. On the contrary, it is determined that the output is within a predetermined range and the bit of this flag is reset to 0, when the output of the switch 140 is the ON signal (H level signal) indicating that the hydraulic pressure is less than the predetermined value.

When the result in S106 is affirmative, the program proceeds to S108 in which the value of a counter COPSH is incremented by one. Specifically, the hydraulic pressure should normally be less than the predetermined value and the switch 140 should accordingly generate the ON signal (H level signal). Nevertheless, since the switch 140 generates the Off signal (L level signal) and is out of the predetermined range, it can be judged that a failure such as wire breaking could happen in the switch 140 and hence, the counter COPSH is incremented. The program then proceeds to S110 in which the value of a second counter NOPSH is incremented by one. When the result in S106 is negative, the program skips S108.

Thee program then proceeds to S112 in which it is determined whether the value of the counter COPSH is equal to or smaller than a reference value COPSHLMT (e.g., 5) and when the result is affirmative, it proceeds to S114 in which the bit of a malfunction-detection flag F.FSD is reset to 0. When the result in S112 is negative, the program proceeds to S116 in which the bit of the flag is set to 1. To set the bit of the flag F.FSD to 1 indicates the malfunction of the hydraulic switch 140 has been detected, while resetting its bit to 0 indicates that the malfunction of the switch has not been detected. When the bit of the flag F.FSD is set to 1, the buzzer 154 is sounded and the warning lamp 152 is turned on to warn the operator.

In the second embodiment, the reason why the upper limit NOPSHLMT (indicating the predetermined period of time) and the reference value COPSHLMT are different from those used in the first embodiment is that, the nature or kind of output of the equipment, more precisely the change of the output of the equipment is different from that in the first embodiment.

Having been configured in the foregoing manner, the system according to the second embodiment can accurately detect or discriminate the malfunction or abnormality of the hydraulic switch (the equipment connected to the engine 16) 140. In addition, no additional component is needed for malfunction detection, the configuration is simple.

It should be noted in the second embodiment too that, it is alternatively possible to obtain the counts for several times and to calculate an average value of the counts so as to further improve the detection accuracy.

It should also be noted in the second embodiment that, at least one or all of the predetermined period of time (corresponding to NOPSHLMT) and the reference value COPSHLMT should be preset based on the nature or kind of the output of the equipment whose malfunction is to be detected.

The embodiment is thus configured to have a system for detecting malfunction of an equipment (alternator 134, hydraulic switch 140) that is connected to an internal combustion engine 16 and generates an output; comprising; output discriminating means (ECU 22, S20, S24, S26, S100, S106, S110) for discriminating periodically (e.g., 100 msec) for a predetermined period of time (CACGLMT, NOPSHLMT) whether the output of the equipment is within a predetermined range; counting means (ECU 22, S22, S108) for counting a number of times (CACG, COPSH) that the output of the equipment is discriminated to be out of the predetermined range; and malfunction determining means (ECU 22, S28–S40, S112–S114) for comparing the count with a reference value (CACGIN, CACGOUT, COPSHLMT) and for determining that the equipment has malfunctioned when the count is equal to or greater than the reference value.

In the system, at least one or all of the predetermined period of time (CACGLMT, NOPSHLMT) and the reference value (CACGIN, CACGOUT, COPSHLMT) is preset based on a nature of the output of the equipment is an alternator 134 that generates alternating current, or the equipment is a hydraulic switch 140 that generates an ON signal when hydraulic pressure of the engine is less than a predetermined value.

It should be noted in the above that, although the alternator 134 and the hydraulic switch 140 are disclosed as examples of the equipment, other device, such as an $O_2$ sensor 110, solenoids used in the variable valve timing system 84, that is connected to the engine 16 and whose malfunction can be detected by determining whether its output is within a predetermined range, could also be examples of the equipment.

It should also be noted that, although the invention has been explained with reference to an embodiment of an outboard motor, the invention is not limited in application to an outboard motor but can also be applied to an inboard motor.

The entire disclosure of Japanese Patent Application No. 2001-315851 filed on Oct. 12, 2001, including specification, claims, drawings and summary, is incorporated herein in reference in its entirety.

While the invention has thus been shown and described with reference to specific embodiments, it should be noted that the invention is in no way limited to the details of the described arrangements but changes and modifications may be made without departing from the scope of the appended claims.

What is claimed is:

1. A system for detecting malfunction of an equipment that is connected to an internal combustion engine and generates an output comprising:

output discriminating means for discriminating periodically for a predetermined period of time whether the output of the equipment is within a predetermined range;

counting means for counting a number of times that the output of the equipment is discriminated to be out of the predetermined range; and malfunction determining means for comparing the count with a reference value and for determining that the equipment has malfunctioned when the count is equal to or greater than the reference value.

2. A system according to claim 1, wherein at least one of the predetermined period of time and the reference value is preset based on a nature of the output of the equipment.

3. A system according to claim 1, wherein the equipment is an alternator that generates alternating current.

4. A system according to claim 1, wherein the equipment is a hydraulic switch that generates an ON signal when hydraulic pressure of the engine is less than a predetermined value.

5. A system according to claim 4, wherein the engine is an engine for an outboard motor.

6. A method of detecting malfunction of an equipment that is connected to an internal combustion engine and generates an output; comprising the steps of;

discriminating periodically for a predetermined period of time whether the output of the equipment is within a predetermined range;

counting a number of times that the output of the equipment is discriminated to be out of the predetermined range; and comparing the count with a reference value and for determining that the equipment has malfunctioned when the count is equal to or greater than the reference value.

7. A method according to claim 6, wherein at least one of the predetermined period of time and the reference value is preset based on a nature of the output of the equipment.

8. A method according to claim 6, wherein the equipment is an alternator that generates alternating current.

9. A method according to claim 6, wherein the equipment is a hydraulic switch that generates on ON signal when hydraulic pressure of the engine is less than a predetermined value.

10. A method according to claim 9, wherein the engine is an engine for an outboard motor.

11. The system according to claim 1, further comprising an alarm coupled to the malfunction determining means to alert a user to the malfunction.

12. The method according to claim 6, further comprising alerting a user when the count is equal to or greater than the reference value.

* * * * *